Patented Oct. 6, 1953

2,654,713

UNITED STATES PATENT OFFICE 2,654,713

PULVERIZABLE AND READILY SOLUBLE BRIGHTENING AGENTS

Fritz Fleck, Basel, Switzerland, assignor to Sandoz A. G., Basel, Switzerland

No Drawing. Application November 18, 1952, Serial No. 321,288. In Switzerland November 22, 1951

8 Claims. (Cl. 252—301.2)

It is known that amino-coumarins of the formula

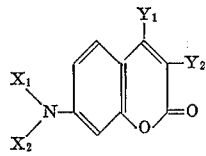

wherein each of $X_1$, $X_2$, $Y_1$ and $Y_2$ stands for hydrogen or alkyl are useful brighteners of protein fibers, synthetic polyamide fibers, casein fibers, acetate silk, etc. However, the said compounds are bound up with the disadvantage that they are only very slightly soluble in water.

Attempts have been made to obviate this defect by the introduction of solubilizing sulfonic acid or carboxylic acid groups into the aromatic nucleus of the compounds or into the side chains $X_1$, $X_2$, $Y_1$ or $Y_2$. It has also been proposed to quaternize the amino group in the 7-position. The so-obtained compounds are in fact of improved solubility, but they are not nearly as effective as the starting substances.

The aforedescribed 7-amino-coumarins are very weak bases, the salts of which, for example the hydrochlorides or sulfates—prepared in stoichiometric proportions—are hydrolyzed by water. Some amino-coumarins, such for example as 4-methyl-7-amino-coumarin, dissolve but slightly even in 10% sulfuric acid or hydrochloric acid. In order to dissolve them, concentrated hydrochloric acid has to be employed. By contrast, other amino-coumarins, such as 7-dimethylamino-4-methyl-coumarin, dissolve readily in dilute mineral acids, but are for the most part thrown out of solution again upon dilution with water.

The present invention is based inter alia on the observation that 4-methyl-7-diethylamino-coumarin is very easily soluble in 2 to 3 parts, per part of 4-methyl-7-diethylamino-coumarin, of sulfuric or hydrochloric acid of 5 to 10% by weight to form a clear solution, from which the 4-methyl-7-diethylamino-coumarin is not precipitated upon dilution of the solution with water. This behavior is wholly unexpected, since homologous compounds wherein the 7-amino group is substituted by higher alkyls than ethyl, are of poorer solubility than diethylamino-coumarin.

The object of the invention is a pulverizable, readily soluble brightening agent and the preparation thereof. This object is realized according to the invention by admixing 4-methyl-7-diethylamino-coumarin, or a salt thereof with a water-soluble acid, with several-fold the quantity by weight, relative to the 4-methyl-7-diethylamino-coumarin, of a solid, acid, water-soluble compound derived from a strong inorganic acid.

In accordance with the present invention, 4-methyl-7-diethylamino-coumarin, or a salt thereof, preferably a salt of a mineral acid, is dissolved in an aqueous solution of the acid compound and then, if necessary after adjustment to the desired acidity, the resultant solution is dried, preferably under reduced pressure or by atomization. It is also possible to start with the solid compounds and to grind these together. Especially suitable acid compounds are for example alkali metal bisulfates, amidosulfonic acid, urea nitrate, urea phosphate, the double salt of amidosulfonic acid and ammonium bisulfate, etc.

The obtained products dissolve, in part, even in the cold in 5 to 10 parts by weight of water per part of product to give clear solutions and, after dilution with water to concentrations such as are used in practice for brightening purposes, yield clear and practically neutral solutions, the pH of which is above 6.7.

The following examples set forth representative exemplary embodiments of the invention, and these examples are intended to be solely illustrative and not at all limitative. In these examples, the parts and percentages are by weight and the temperatures are expressed in degrees centigrade.

As is manifest from the foregoing illustrative examples, the quantity of acid derivative employed is several-fold the quantity of amino-coumarin. A suitable range in this regard, according to the invention, is from about two-fold to about ten-fold the amount of acid derivative as compared with the amount of amino-coumarin employed.

*Example 1*

50 parts of 4-methyl-7-diethylamino-coumarin hydrochloride, obtained by dissolving amino-coumarin in the three-fold quantity of 10% hydrochloric acid and evaporating the solution under reduced pressure, is intimately admixed with 150 parts of sodium bisulfate. A practically white powder is obtained which dissolved readily in cold water. An aqueous solution thereof, containing 25 milligrams per liter tap water, has a pH of about 7.0. The sodium bisulfate may be replaced by potassium bisulfate, and the hydrochloride may be replaced by the sulfate, phosphate, formate, citrate, tartrate, gluconate, borate or amido-sulfonate.

Example 2

50 parts of 4-methyl-7-diethylamino-coumarin are pulverized together with 450 parts of sodium bisulfate. An almost white, easily hygroscopic powder, which dissolves readily in the four-fold quantity of water to yield a clear solution, is obtained. Upon dilution with tap water to a concentration of 30 milligrams per liter, the solution remains clear and has a pH of 6.7 to 7.0.

A similar product is obtained if the said aminocoumarine is replaced by its hydrochloride, prepared as described in Example 1, or by its sulfate, prepared by mixing 1 mole of the fused base with 1 mole of concentrated sulfuric acid.

Example 3

50 parts of 4-methyl-7-diethylamino-coumarin are dissolved at 40° in a mixture of 10.6 parts of concentrated sulfuric acid, 139.5 parts sodium bisulfate and 433 parts of water. The solution is evaporated to dryness under reduced pressure. The residue, which consists of a mixture of amino-coumarin sulfate and sodium bisulfate, is a hard crystalline mass which, depending upon the degree of purity of the starting aminocoumarin, has a more or less reddish coloration, and which can be pulverized as desired. The yield amounts to 197 parts, corresponding to 98% of the theory. The product dissolves easily in cold water and, the solution at a concentration of 50 milligrams per liter tap water, has a pH of 7.1.

Example 4

69.7 parts of concentrated sulfuric acid are stirred into 240 parts of cold water, the temperature being retained below 40°. 50 parts of 4-methyl-7-diethylamino-coumarin are added to this acid solution, filtration is effected through an acid-resistent filter, the filtrate heated at 90° and, while stirring vigorously, 82.5 parts of anhydrous sodium sulfate added. Upon cooling, a reddish crystalline pulp is obtained which is evaporated to dryness under reduced pressure and then dried to a constant weight. By grinding the dry residue, there is obtained a weakly reddish stable granular powder having a melting point of 170–180° and being quickly and completely soluble in the five-fold quantity of cold water. The yield amounts to 190–196 parts (95–98% of the theory). Aqueous solutions containing 50 milligrams per liter tap water of the resultant preparation have a practically neutral reaction.

If the concentrated sulfuric acid is dissolved in 430 parts instead of 240 parts of water and then the sodium sulfate added, there is obtained a solution of sodium bisulfate in which the amino-coumarin can be dissolved at 50°. By drying the solution in an atomizing dryer, a readily soluble powder is obtained.

Example 5

50 parts of 4-methyl-7-diethylamino-coumarin in admixture with 250 parts of amidosulfonic acid are finely ground. The resultant weakly grayish, light powder dissolves very easily in the ten-fold amount of lukewarm tap-water, yielding practically neutral solutions which are ready for use.

Example 6

A mixture of 50 parts of 4-methyl-7-diethylamino-coumarin and 200 parts of urea nitrate are ground in a drum. A light gray powder is obtained which dissolves well in warm water.

Example 7

50 parts of the hydrochloride of 4-methyl-7-diethylamino-coumarin and 450 parts of primary urea-phosphate are ground together. There is obtained a greenish-yellow powder which dissolves very easily in warm water.

Example 8

With the product described in Example 4 an uncolored wool fabric is treated as follows: 1 part of the brightener is dissolved in 40,000 parts of water and 1,000 parts of the wool tissue is immersed and moved around in this bath at 40° C. for half an hour. The wool is rinsed and dried. It shows a distinct brighter appearance than an untreated fabric.

Having thus disclosed the invention, what is claimed is:

1. A method for the preparation of a pulverizable and readily water-soluble brightening agent, which comprises admixing a member selected from the group consisting of 4-methyl-7-diethylamino-coumarin and salts thereof with a water-soluble acid with several-fold the quantity by weight, relative to the weight of the 4-methyl-7-diethylamino-coumarin, of a water-soluble solid acid salt of a strong inorganic acid.

2. A method for the preparation of a pulverizable and readily water-soluble brightening agent, which comprises dissolving a member selected from the group consisting of 4-methyl-7-diethylamino-coumarin and salts thereof with a water-soluble acid in an aqueous solution of a water-soluble acid salt of a strong inorganic acid containing several-fold the quantity by weight, relative to the weight of the 4-methyl-7-diethylamino-coumarin, of the said acid salt, and then drying the resultant solution.

3. A pulverizable and readily water-soluble brightening agent, consisting essentially of a mixture of a member selected from the group consisting of 4-methyl-7-diethylamino-coumarin and salts thereof with a water-soluble acid with several-fold the quantity by weight, relative to the weight of the 4-methyl-7-diethylamino-coumarin, of a water-soluble solid acid salt of a strong inorganic acid.

4. A brightening agent according to claim 3, wherein said acid salt is an alkali metal bisulfate.

5. A brightening agent according to claim 3, wherein said acid salt is sodium bisulfate.

6. A brightening agent according to claim 3, wherein said acid salt is urea nitrate.

7. A brightening agent according to claim 3, wherein said acid salt is amidosulfonic acid.

8. A brightening agent according to claim 3, wherein said acid salt is urea phosphate.

FRITZ FLECK.

References Cited in the file of this patent

UNITED STATES PATENTS

| Number | Name | Date |
|---|---|---|
| 2,334,348 | Miglarese | Nov. 16, 1943 |
| 2,341,009 | Axelrad | Feb. 8, 1944 |
| 2,620,282 | Fry | Dec. 2, 1952 |